Sept. 2, 1924.

H. P. WESTCOTT

GAUGE

Filed April 12, 1922          2 Sheets-Sheet 1

Sept. 2, 1924.

H. P. WESTCOTT

GAUGE

Filed April 12, 1922

Inventor
Henry P. Westcott
By
Attorney

Patented Sept. 2, 1924.

1,507,538

UNITED STATES PATENT OFFICE.

HENRY P. WESTCOTT, OF ERIE, PENNSYLVANIA; ADA K. WESTCOTT ADMINISTRATRIX OF SAID HENRY P. WESTCOTT, DECEASED.

GAUGE.

Application filed April 12, 1922. Serial No. 551,959.

*To all whom it may concern:*

Be it known that I, HENRY P. WESTCOTT, a citizen of the United States, residing at Erie, in the county of Erie and State of Pennsylvania, have invented new and useful Improvements in Gauges, of which the following is a specification.

This invention relates to recording pressure gauges for gas lines and particularly to such gauges as are used in connection with orifice meters or other like devices for measuring gas, steam, oil or other fluid in which independent scribing elements move over a clock controlled revolving chart, one of said scribing elements being actuated by means responsive to differential pressure on the opposite sides of the orifice, for recording said differential pressure on the chart, and the other being responsive to, and recording the static pressure in the gas line.

In gauges of this type it is customary to remove the chart after one revolution thereof, that is, at the end of twenty-four hours and to average the pressures recorded thereupon, both differential and static for each hour, using the values thus obtained to compute the volume of fluid passing through the meter in a unit period of time.

This formula for gas is $$Co\sqrt{h(14.4+P)} = \text{volume of gas per hour},$$

is which
  h = the average differential pressure per hour expressed in inches of water
  P = the average static pressure per hour
  14.4 = the average value in pounds of atmospheric pressure,
and Co is a coefficient depending for its value upon the size of the orifice, size of pipe line, specific gravity of the fluid, the pressure base and temperature.

The present invention is an improvement in a recording gauge of the type described and has for its principal object the provision of an auxiliary chart, cooperable with one of the scriber arms of the recording gauge, by means of which the rate of flow of gas, at any instant, may be directly read from the auxiliary chart, the scriber arm acting as an indicator.

More specifically, the object of the invention is to provide an indicating chart adapted to be positioned relative to the recording chart so that the scriber arm serves simultaneously as a recorder and a visual indicator, said chart being so mounted as to be bodily movable, with its mount, from its operative position, so as to give unhampered access to the recording chart for the purpose of reading or removing the latter, and to be automatically returned to operative position upon the replacement of its mount.

With the above and other objects in view, my invention consists in the improved gauge illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1:
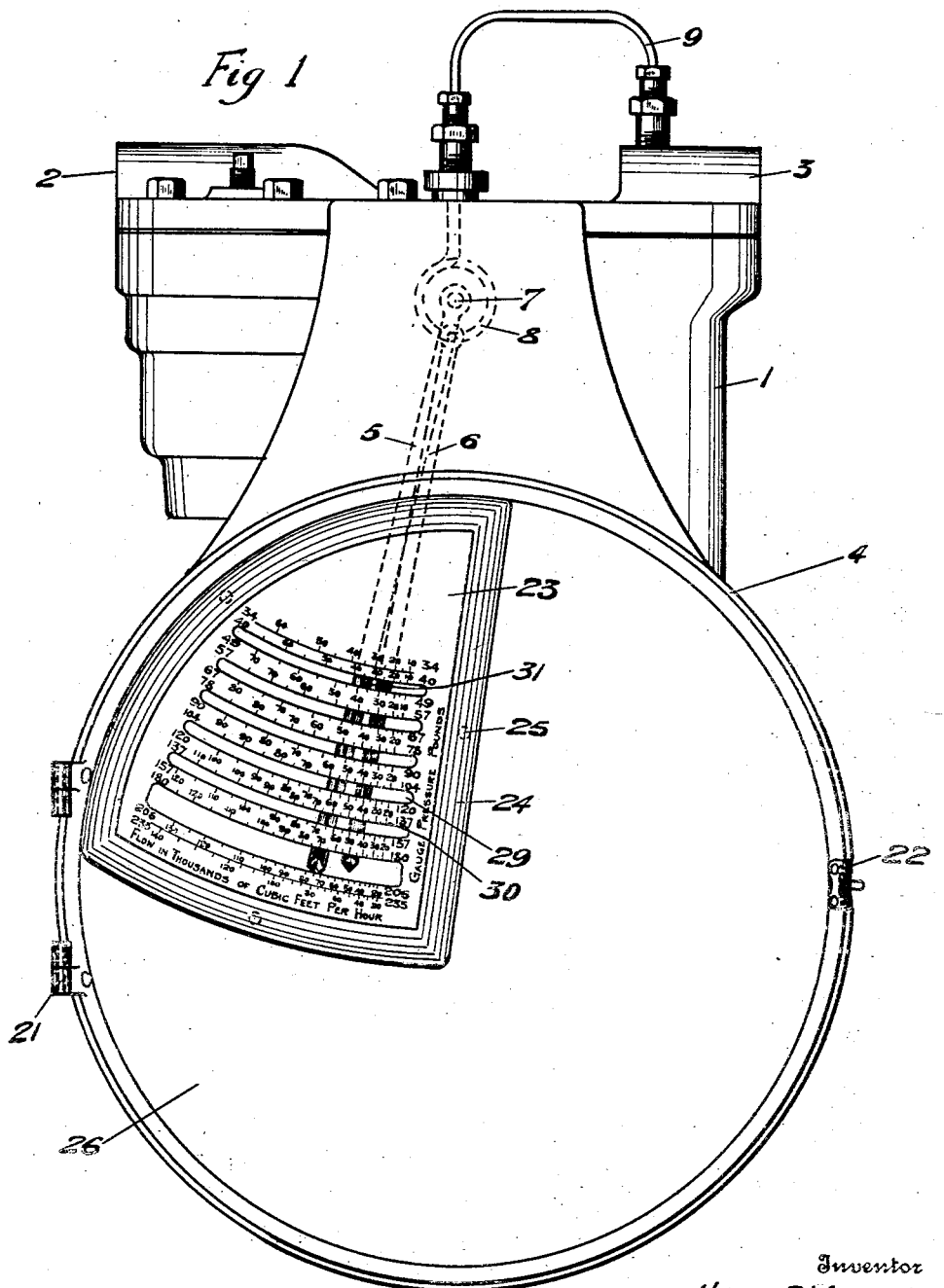
Figure 1 is a front elevation showing my invention combined with a recording differential and static pressure gauge of the type described.

Referring now in detail to the several figures the numeral 1 represents the casing of the orifice meter, having the gas inlet passage 2 and the gas outlet 3. As the construction of this meter is well known a description thereof is unnecessary. The meter affords support for the gauge casing 4, the upper portion of which houses the mountings for the scriber arms 5 and 6, the former being carried upon a transverse shaft 7 which extends from the meter casing and is connected to mechanism responsive to differential pressure within said meter. The scriber arm 6 is connected to the end of a Bourdon tube 8 arranged in a coil concentric with the shaft 7 and communicating by means of the conduit 9 with the interior of the meter, being thereby subjected to the static pressure of gas within said meter. The lower portion of the gauge casing 4 is in the form of a flat cylinder in which is mounted clockworks having a shaft 10 projecting through an aperture in the front face of said casing and having a knob 11 on its forward end serving as a means of attachment for the removable chart 12.

Figure 2:
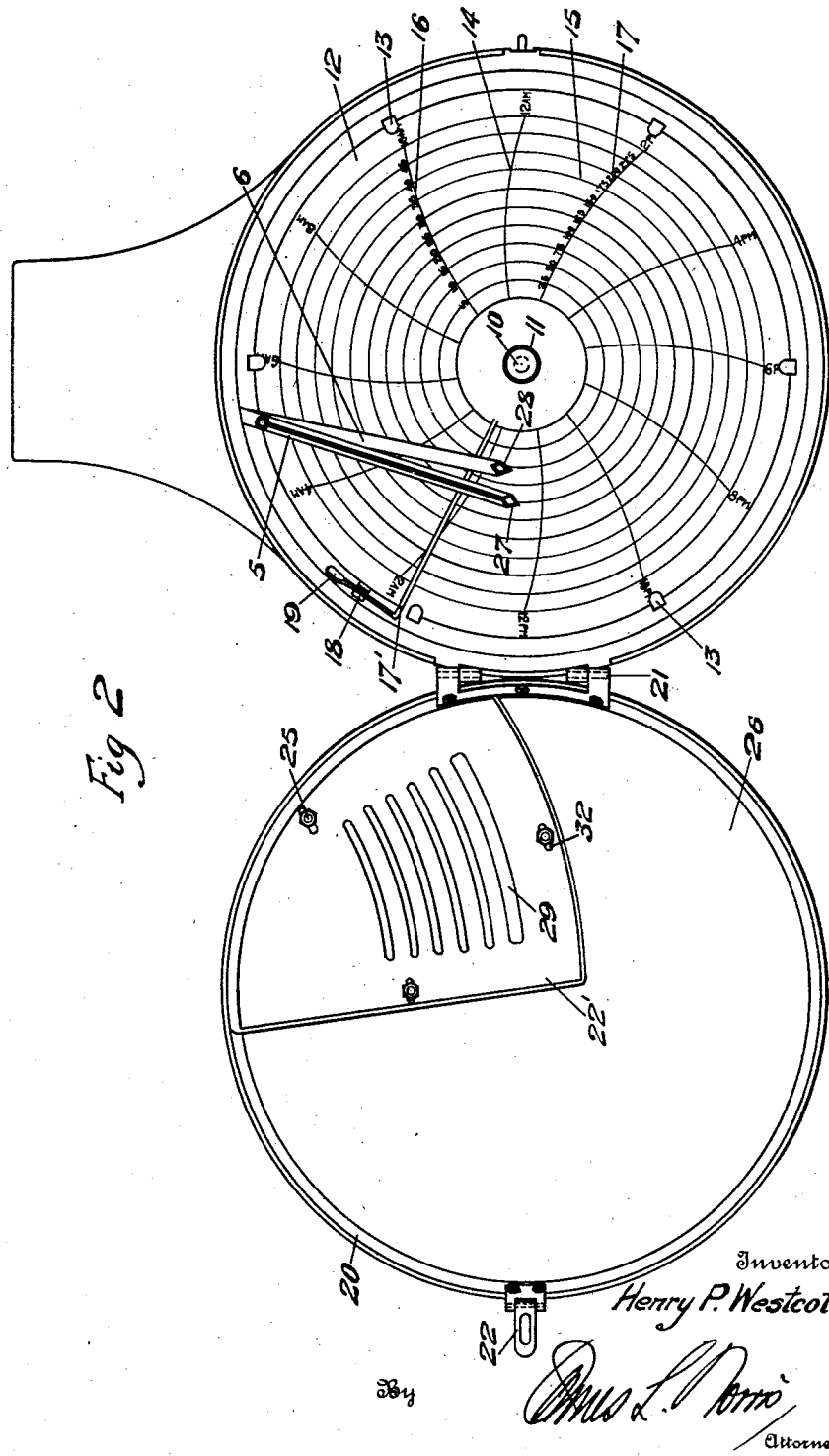
Figure 2 is a view in front elevation showing the door of the pressure gauge opened disclosing the improved chart mounted thereupon.

This chart is made of paper or other appropriate material and is slidably held behind peripheral lugs 13, shown in Figure 2. Said chart is marked with concentric rings 15 representing pressure values and with radiating curves 14 by means of which the chart is divided into spaces representing hour-intervals. The concentric rings 15 are designated by two sets of numerals which are, for convenience, printed in different colors along two of the radiating curves, one series 16 of numerals being done in one color, for instance black ink and indicating pounds of static pressure, the other series 17 being printed in another color, for instance red ink and denoting differential pressures in terms of inches of water.

The scriber arms 5 and 6 are each provided at their ends with scribers 27 and 28 adapted to be filled with marking material, it being intended that the scriber arm 5 shall trace a red line on the chart while the line traced by the scriber arm 6 is preferably black. A lifter 17' is provided which is pivotally mounted at 18 upon the face of the casing 4 beyond the edges of the chart, and extends beneath the scriber arms, normally out of contact therewith but capable of engaging them and raising the scribers from the chart when the handle 19 is depressed. This is done for convenience in removing the chart, which is presumed to be renewed every 24 hours at the end of one complete revolution, and in order to refill the scribers with marking material.

The casing 4 is provided with a door 20 hingedly secured thereto at 21 and provided with latching means 22.

So much of the structure as has been described up to this point is old in the art. A gauge of this type is tended by removing the chart at the stated intervals and replacing it with a blank chart. The recorded chart is sent to a computing office where the differential pressures and static pressures indicated by the red and black curves respectively are averaged for each hour-interval and used in conjunction with a coefficient value, which is constant for a given size of orifice, for determining the volume of gas flowing through the meter within the measured time interval. The formula from which the value of this volume is derived has been stated in the earlier part of this specification.

It is frequently advantageous to be able to tell at a glance the rate of flow of fluid passing through the meter at any particular moment. The improvement which constitutes the subject matter of the present invention concerns itself with means whereby the rate of flow may be read directly from the gauge without reference to formula or tables. This improvement comprises the auxiliary chart 22' which is mounted within the door 20 as shown in Figure 2. For this purpose the door is provided with a transparent portion 23 enclosed within a frame 24 which may be secured to the door in any suitable manner. Said frame is here shown as attached to the metallic plate 26, which forms a closure for said door, but it is well within the scope of the invention to have the entire door transparent in which case the frame may be dispensed with as unnecessary.

It will be observed that the scriber arms 5 and 6 are confined in their range of movement entirely to one quadrant of the circular chart 12, so that it is not necessary that the transparent portion 23 shall cover a space greater than one quadrant. Nor is the invention limited to the positioning of the chart in any particular quadrant for it is obvious that the scriber arms 5 and 6 may be so proportioned that their extremities will have a range of movement in any quadrant and it is also contemplated that the invention shall be equally adaptable in its application to gauges which occupy a reverse position to the one shown in the present drawing with the scriber arms pivotally mounted within the bottom instead of the top of the gauge casing.

The auxiliary chart 23 is removably retained within the frame 24 by means of the bolts 25 so that said chart may be replaced from time to time with another chart of the same character, but provided with a different tabulation of values, said change being necessary whenever, for any reason, the size of the orifice in the meter is altered or change is made in the size of the pipe line. The bolts 25 project through arcuate slots 32, shown in Figure 2, said slots being formed in the auxiliary chart with a curvature having its center in the axis of oscillation of the scriber arms 5 and 6. Said slots are for the purpose of permitting a rotary shifting of said auxiliary chart in order to determine its accurate initial setting with respect to the zero position of the scriber arm 5.

The auxiliary chart 23 consists of a flat sheet, preferably of enameled metal, having a series of arcuate slots 29 arranged with curvatures concentric with the axis of oscillation of the scriber arms, the lowermost slot being made of double the width of the other slots and being adjacent the path of movement of the scribers 27 and 28 it being particularly desirable that said scribers shall be visible through said slot and that the scriber arm 5 shall be visible through all the slots. The curved edges of each slot are marked with a scale 30, divided into spaces designated by numbers which indicate volumes of fluid per unit of time, and at the end of each scale is a number designating a definite static pressure for which said scale has been developed. The auxiliary chart is placed in a definite position, initially, with respect to the zero position of the scriber arm 5 which indicates differential pressure, said arm being provided with a narrow longitudinal streak 31 of distinguishing color and serving as an indicator with reference to the scales along the edges of said slots, by which to read the auxiliary chart with ease and accuracy.

In the chart exemplified in the drawings, advantage has been taken of the space above the uppermost slot and below the lowermost slot to inscribe additional scales thereby increasing the capacity of the chart. These additional scales are read by the position of the scriber arm as viewed through the uppermost and lowermost slots respectively.

In reading the auxiliary chart the operator first takes note of the static pressure. This he does by observing the position of the static pressure scriber 28 with respect to its scale upon the lower chart. As the scale for static pressure which is shown inscribed adjacent one of the radial curves may not happen to be in sight at the time the observation is made, the operator may for the first few times he reads the meter have to open the door in order to determine with which of the concentric circles the scriber 28 is in registry. After little experience he learns that the innermost circle represents a static pressure of zero; that the next represents a pressure of five pounds, etc. so that thereafter he will not have to open the door in order to take the reading. After having determined the static pressure by observing the position of the scriber 28 he then looks at that one of the series of scales on the auxiliary chart 23 which has an index corresponding to the noted static pressure and the value of that scale which is indicated by the streak 31 upon the scriber arm 5 is the required value representing the rate of flow of gas per hour at the time of the observation. He then observes the position of the scriber arm 5 as viewed through the slot for which the selected pressure value is the index, and the point on the scale adjacent said slot, with which said scriber arm alines gives a direct reading of the rate of flow of fluid per unit of time, then passing through the meter. The convenience of location of my improved chart will be appreciated when it is observed that the single act of closing the door which must be performed under any circumstances to obtain the record of the meter, places the auxiliary chart in position to be read, and that opening the door takes it entirely away from association with the chart 12, permitting the unhampered removal of the latter and the filling of the scribers 27 and 28.

While I have above described what I have found to be a very practical embodiment of my invention it is nevertheless to be understood that the auxiliary chart may also be exemplified in numerous other alternative relations, and I accordingly reserve the right of adopting all such legitimate changes as may be fairly embodied in the spirit and scope of the invention as claimed.

Having described my invention what I claim as new and desire to secure by Letters Patent, is:—

1. A gauge comprising a plurality of charts arranged in superposed relation, the upper chart being provided with a sight opening and a series of scales, the lower chart being also provided with a scale, a plurality of indicating means arranged between said charts, one of said means being movable with respect to the scale on the lower chart, each scale of the series of scales on the upper chart being furnished with an index having a value identified with one of the values indicated on the scale of the lower chart by its indicating means, the other of said indicating means being movable with respect to the series of scales on the upper chart to indicate at any time a desired value, on that one of the scales of said series whose index corresponds with the value indicated by the first mentioned indicating means relative to its scale on the lower chart.

2. A gauge comprising a plurality of charts arranged in superposed relation, a pair of co-axial pivoted indicating members arranged between said charts, the upper chart being provided with an arcuate sight opening having a curvature concentric with the axis of said pivoted members and having a series of scales, the lower chart being also provided with a scale, one of said indicating members being movable with respect to the scale on the lower chart, each scale of the series of scales on the upper chart being furnished with an index having a value identified with one of the values indicated on the scale of the lower chart by its indicating member, the other indicating member being movable with respect to the series of scales on the upper chart to indicate at any time a desired value, on that one of the scales on said series whose index corresponds with the value indicated by the first mentioned indicating member relative to its scale on the lower chart.

3. A gauge including a casing, a hinged door for said casing, a recording chart associated with said gauge and enclosable within said door, a scribing element for said chart, an auxiliary chart carried by said door, said scribing element functioning as an indicator in cooperation with said auxiliary chart when said door is closed.

4. A gauge including a casing, a hinged door for said casing, a recording chart associated with said gauge enclosable within said door, a scribing element for said chart, an auxiliary chart carried by said door and provided with a sight opening, said scribing element being visible through said sight opening and functioning as an indicator in cooperation with said auxiliary chart when said door is closed.

5. A gauge including a casing, a hinged door for said casing, a recording chart associated with said gauge and enclosable within said door, a pair of co-axial pivotally movable scribing elements for said recording chart, an auxiliary chart carried by said door having concentric arcuate slots the center of curvature of which is concentric with the axis of said scribing elements, a scale on the auxiliary chart adjacent each slot and a scale on the recording chart, said scribing elements being visible through said slots when the door is closed and functioning as an indicator, one with respect to the scales on the auxiliary chart and the other with respect to the scale on the recording chart.

6. A gauge including a casing, a hinged door for said casing, a recording chart associated with said gauge and enclosable within said door, a pair of co-axial pivotally movable scribing elements for said recording chart, an auxiliary chart removably carried by said door having concentric arcuate slots the center of curvature of which is concentric with the axis of said scribing elements, a scale on the auxiliary chart adjacent each slot and a scale on the recording chart, said scribing elements being visible through said slots when the door is closed functioning as indicators, one with respect to the scales on the auxiliary chart and the other with respect to the scale on the recording chart.

7. A pressure gauge including a casing, a door for said casing, a recording chart associated with said gauge and enclosable within said door, a pair of scribing elements for recording the values of separate functions of said pressure gauge upon said chart, one of said scribing elements being pivotally mounted, an auxiliary chart carried by said door having a plurality of sight openings, a scale adjacent each sight opening, said scales being provided with numbers inscribed adjacent thereto, said numbers corresponding to values indicated by one of said scribing elements, the other of said scribing elements being visible through said sight openings when the door is closed and functioning as an indicator with respect to said scales.

8. A pressure gauge including a casing, a door for said casing, a recording chart associated with said gauge and enclosable within said door, a pair of scribing elements for recording the values of separate functions of said pressure gauge upon said chart, one of said scribing elements being pivotally mounted, an auxiliary chart carried by said door having concentric arcuate slots the center of curvature of which is coincident with the axis of said pivoted scribing element, scales adjacent each slot, each provided with a number inscribed adjacent thereto, said numbers corresponding to values indicated by one of said scribing elements, the other of said scribing elements being visible through said arcuate slots when the door is closed and functioning as an indicator with respect to said scales.

9. A gauge comprising a plurality of charts arranged in superposed relation, one of said charts being provided with a sight opening, pivotal indicating means arranged between said charts to cooperate with scales on both charts, said means being visible through said sight opening and means for shifting said chart axially of said pivotal means.

10. A gauge including a chart, a recording element for said chart, an auxiliary chart provided with a scale, the recording element functioning as an indicator in cooperation with said scale, and means for shifting said chart with respect to said recording element.

11. A gauge including a chart, a pivotal recording element for said chart, an auxiliary chart provided with a scale, means for supporting said auxiliary chart in operative relation to said recording element, said recording element functioning as an indicator in cooperation with said scale, and means for shifting said chart relative to said supporting means.

12. A gauge including a chart, a pivotal recording element for said chart, an auxiliary chart provided with a scale, means for supporting said chart in operative relation to said recording element, the recording element functioning as an indicator in cooperation with said scale, and means for shifting said chart relative to said supporting means about the axis of said recording element.

13. A gauge including a casing, a hinged door for said casing, a recording chart associated with said gauge and enclosable within said door, a pair of coaxially pivoted scribing arms, scribers carried by said arms and cooperable with said recording chart, an auxiliary chart carried by said door having concentric arcuate slots, one of said slots being of sufficient width to expose both of said scribers, the center of curvature of said slots being coincident with the axis of said scribing arms, a scale adjacent each slot, one of said scribing arms being visible through said slots when the door is closed and functioning as an indicator with respect to said scales.

In testimony whereof I have hereunto set my hand.

HENRY P. WESTCOTT.